US007374002B2

(12) United States Patent
Fought

(10) Patent No.: US 7,374,002 B2
(45) **Date of Patent: *May 20, 2008**

(54) WHEELCHAIR SUSPENSION

(75) Inventor: Gerald E. Fought, Columbia Station, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,834

(22) Filed: Jun. 26, 2006

(65) Prior Publication Data

US 2006/0249317 A1 Nov. 9, 2006

Related U.S. Application Data

(63) Continuation of application No. 10/044,826, filed on Oct. 19, 2001, now Pat. No. 7,066,290.

(51) Int. Cl.
*B60G 5/04* (2006.01)

(52) U.S. Cl. ...................... 180/65.5; 180/907; 280/755

(58) Field of Classification Search ............... 180/65.1, 180/65.5, 907, 59, 60, 6.5, 24.02, 24.03, 180/24.07; 280/124.1, 5.28, 755, 767
See application file for complete search history.

(56) References Cited

U.S. PATENT DOCUMENTS 2,427,482 A 9/1947 Wiessman
2,986,200 A 5/1961 Nobile
3,104,112 A 9/1963 Crail
3,174,176 A 3/1965 Olson
3,191,990 A 6/1965 Rugg et al.
3,195,670 A 7/1965 Dunn
3,210,092 A 10/1965 Kraus
3,573,877 A 4/1971 Locke
3,580,591 A 5/1971 Coffey
3,589,700 A 6/1971 Ruet et al.
3,592,282 A 7/1971 Soileau
3,602,522 A 8/1971 Zamotin
3,661,228 A 5/1972 Glasser
3,664,450 A 5/1972 Udden et al.
3,682,462 A 8/1972 Papousek (Continued)

FOREIGN PATENT DOCUMENTS

CA 2254372 5/2000

(Continued)

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.

(Continued)

*Primary Examiner*—Anne Marie Boehler
(74) *Attorney, Agent, or Firm*—Calfee Halter & Griswold

(57) ABSTRACT

The present invention provides a suspension for a conveyance that is capable of traversing obstacles and rough terrain. The suspension includes a frame, a pivot arm, a front caster, a drive assembly and a rear caster. The pivot arm substantially remains in a first position when the drive assembly moves in a first direction. Movement of the drive assembly in a second direction urges the pivot arm away from the first position.

47 Claims, 9 Drawing Sheets

U.S. PATENT DOCUMENTS

| | | | |
|---|---|---|---|
| 3,709,313 | A | 1/1973 | James |
| 3,848,883 | A | 11/1974 | Breacain |
| 3,862,751 | A | 1/1975 | Schwaller |
| 3,876,012 | A | 4/1975 | Regier |
| 3,883,153 | A | 5/1975 | Singh et al. |
| 3,901,527 | A | 8/1975 | Danziger et al. |
| 3,905,437 | A | 9/1975 | Kaiho et al. |
| 3,917,312 | A | 11/1975 | Rodaway |
| 3,952,822 | A | 4/1976 | Udden et al. |
| 3,953,054 | A | 4/1976 | Udden et al. |
| 3,976,152 | A | 8/1976 | Bell |
| 4,108,449 | A | 8/1978 | Rhodes |
| 4,118,020 | A | 10/1978 | Myers |
| 4,119,163 | A | 10/1978 | Ball |
| 4,128,137 | A | 12/1978 | Booth |
| 4,222,449 | A | 9/1980 | Feliz |
| 4,264,085 | A | 4/1981 | Volin |
| 4,310,167 | A | 1/1982 | McLaurin |
| 4,333,681 | A | 6/1982 | Nelson |
| 4,337,958 | A | 7/1982 | Witt et al. |
| 4,341,278 | A | 7/1982 | Meyer |
| 4,375,295 | A | 3/1983 | Volin |
| 4,437,678 | A | 3/1984 | Schultz |
| 4,455,029 | A | 6/1984 | Taylor |
| 4,455,031 | A | 6/1984 | Hosaka |
| 4,483,407 | A | 11/1984 | Iwamoto et al. |
| 4,500,102 | A | 2/1985 | Haury et al. |
| 4,513,832 | A | 4/1985 | Engman |
| 4,545,593 | A | 10/1985 | Farnam |
| 4,545,616 | A | 10/1985 | Booth |
| 4,556,229 | A | 12/1985 | Bihler et al. |
| 4,565,385 | A | 1/1986 | Morford |
| RE32,242 | E | 9/1986 | Minnebraker |
| 4,618,155 | A | 10/1986 | Jayne |
| 4,687,068 | A | 8/1987 | Pagett |
| 4,720,223 | A | 1/1988 | Neights et al. |
| 4,721,322 | A | 1/1988 | Hawkins |
| 4,759,418 | A | 7/1988 | Goldenfeld et al. |
| 4,805,712 | A | 2/1989 | Singleton |
| 4,811,966 | A | 3/1989 | Singleton |
| 4,823,900 | A | 4/1989 | Farnam |
| 4,826,194 | A | 5/1989 | Sakita |
| 4,840,394 | A | 6/1989 | Bickler |
| 4,861,056 | A | 8/1989 | Duffy, Jr. et al. |
| 4,862,983 | A | 9/1989 | Kreft |
| 4,886,294 | A | 12/1989 | Nahachewski |
| 4,905,972 | A | 3/1990 | Scowen |
| 4,919,441 | A | 4/1990 | Marier et al. |
| 4,926,952 | A | 5/1990 | Farnam |
| 4,934,626 | A | 6/1990 | Kimura |
| 4,962,942 | A | 10/1990 | Barnett et al. |
| 5,123,495 | A | 6/1992 | Littlejohn et al. |
| 5,176,393 | A | 1/1993 | Robertson et al. |
| 5,180,275 | A | 1/1993 | Czech et al. |
| 5,183,133 | A | 2/1993 | Roy et al. |
| 5,222,567 | A | 6/1993 | Broadhead et al. |
| 5,228,709 | A | 7/1993 | Kao |
| 5,230,522 | A | 7/1993 | Gehlsen et al. |
| 5,241,876 | A | 9/1993 | Mathis |
| 5,248,007 | A | 9/1993 | Watkins et al. |
| 5,290,055 | A | 3/1994 | Treat, Jr. |
| 5,294,141 | A | 3/1994 | Mentessi et al. |
| 5,316,328 | A | 5/1994 | Bussinger |
| 5,341,533 | A | 8/1994 | Seitz |
| 5,351,774 | A | 10/1994 | Okamato |
| 5,372,211 | A | 12/1994 | Wilcox et al. |
| 5,435,404 | A | 7/1995 | Garin, III |
| 5,447,317 | A | 9/1995 | Gehlsen et al. |
| 5,467,838 | A | 11/1995 | Wu |
| 5,482,261 | A | 1/1996 | Ortega |
| 5,513,875 | A | 5/1996 | Tahara et al. |
| 5,518,081 | A | 5/1996 | Thibodeau |
| 5,531,284 | A | 7/1996 | Okamoto |
| 5,540,297 | A | 7/1996 | Meier |
| 5,562,172 | A | 10/1996 | Mick |
| 5,564,512 | A | 10/1996 | Scheulderman |
| 5,575,348 | A | 11/1996 | Goertzen et al. |
| 5,611,555 | A | 3/1997 | Vidal |
| 5,727,802 | A | 3/1998 | Garven, Jr. et al. |
| 5,772,237 | A | 6/1998 | Finch et al. |
| D397,645 | S | 9/1998 | Schaffner |
| 5,833,248 | A | 11/1998 | Eguchi |
| 5,848,658 | A | 12/1998 | Pulver |
| 5,851,019 | A | 12/1998 | Gill et al. |
| 5,853,059 | A | 12/1998 | Goertzen et al. |
| D404,693 | S | 1/1999 | Schaffner |
| 5,855,387 | A | 1/1999 | Gill et al. |
| 5,899,475 | A | 5/1999 | Verhaeg et al. |
| 5,904,214 | A | 5/1999 | Lin |
| 5,944,131 | A | 8/1999 | Schaffner et al. |
| 5,954,351 | A | 9/1999 | Koschinat |
| 5,964,473 | A | 10/1999 | Degonda et al. |
| 6,003,624 | A | 12/1999 | Jorgensen et al. |
| 6,041,876 | A | 3/2000 | Pulver et al. |
| 6,047,979 | A | 4/2000 | Kraft et al. |
| 6,062,600 | A | 5/2000 | Kamen et al. |
| 6,070,898 | A | 6/2000 | Dickie et al. |
| 6,079,698 | A | 6/2000 | Patterson et al. |
| 6,079,725 | A | 6/2000 | Lazaros |
| D429,665 | S | 8/2000 | Dickie |
| 6,129,165 | A | 10/2000 | Schaffner et al. |
| 6,131,679 | A | 10/2000 | Pulver et al. |
| 6,176,335 | B1 | 1/2001 | Schaffner et al. |
| 6,179,076 | B1 | 1/2001 | Fernie et al. |
| 6,186,252 | B1 | 2/2001 | Schaffner et al. |
| 6,196,343 | B1 | 3/2001 | Strautnieks |
| 6,199,647 | B1 | 3/2001 | Schaffner et al. |
| 6,206,119 | B1 | 3/2001 | Wu |
| 6,209,670 | B1 | 4/2001 | Fernic et al. |
| 6,225,894 | B1 | 5/2001 | Kyrtsos |
| 6,234,263 | B1 | 5/2001 | Boivin et al. |
| 6,234,507 | B1 | 5/2001 | Dickie et al. |
| 6,279,927 | B1 | 8/2001 | Nishihira et al. |
| 6,312,000 | B1 | 11/2001 | Pauls et al. |
| 6,322,089 | B1 | 11/2001 | Dantele et al. |
| 6,341,657 | B1 | 1/2002 | Hopely, Jr. et al. |
| 6,341,671 | B1 | 1/2002 | Ebersole |
| 6,347,688 | B1 | 2/2002 | Hall et al. |
| 6,357,793 | B1 | 3/2002 | Dickie et al. |
| 6,405,816 | B1 | 6/2002 | Kamen et al. |
| 6,428,020 | B1 | 8/2002 | Steadman |
| 6,454,286 | B1 | 9/2002 | Hosino |
| 6,460,641 | B1 * | 10/2002 | Kral ........................ 180/24.02 |
| 6,460,869 | B1 | 10/2002 | Tremouilles |
| 6,533,305 | B1 | 3/2003 | Falk |
| 6,533,306 | B2 | 3/2003 | Watkins |
| 6,543,564 | B1 | 4/2003 | Kamen et al. |
| 6,543,798 | B2 | 4/2003 | Schaffner et al. |
| 6,554,086 | B1 | 4/2003 | Goertzen et al. |
| 6,568,030 | B1 | 5/2003 | Watanable et al. |
| 6,581,711 | B1 | 6/2003 | Tuluie |
| 6,588,799 | B1 | 7/2003 | Sanchez |
| 6,640,916 | B2 | 11/2003 | Schaffner et al. |
| 6,688,437 | B2 | 2/2004 | Usherovich |
| 6,715,845 | B2 | 4/2004 | Kamen et al. |
| 6,923,280 | B2 | 8/2005 | Goertzen et al. |
| 6,935,448 | B2 | 8/2005 | Goertzen et al. |
| 7,066,290 | B2 * | 6/2006 | Fought ...................... 180/65.5 |
| 7,100,716 | B2 | 9/2006 | Engels et al. |
| 2003/0122332 | A1 | 7/2003 | Engels et al. |
| 2003/0168265 | A1 * | 9/2003 | Goertzen et al. .......... 180/65.1 |
| 2004/0032119 | A1 | 2/2004 | Tran |
| 2005/0225040 | A1 | 10/2005 | Goertzen et al. |

2006/0021806 A1 2/2006 Goertzen et al.

FOREIGN PATENT DOCUMENTS

| | | |
|---|---|---|
| DE | 10136368 A1 | 2/2003 |
| DE | 10136369 A1 | 2/2003 |
| EP | 0127929 | 12/1984 |
| EP | 445171 | 9/1991 |
| EP | 0677285 | 10/1995 |
| EP | 0908165 | 4/1999 |
| EP | 0908166 | 4/1999 |
| EP | 0988848 | 3/2000 |
| EP | 1279391 | 1/2003 |
| EP | 1279392 | 1/2003 |
| FR | 2399822 | 3/1979 |
| FR | 2498925 | 8/1982 |
| JP | 58-48304 | 3/1983 |
| JP | 04-158864 | 6/1992 |
| JP | 07-328073 | 12/1995 |
| JP | 08-038552 | 2/1996 |
| JP | 410248877 | 9/1998 |
| JP | 2000102569 | 4/2000 |
| JP | 2000288032 | 10/2000 |
| JP | 2001070347 | 3/2001 |
| JP | 2001104391 | 4/2001 |
| JP | 2001212181 | 8/2001 |
| JP | 2001258948 | 9/2001 |
| JP | 2001327545 | 11/2001 |
| JP | 2002143223 | 5/2002 |
| JP | 2002165841 | 6/2002 |
| WO | WO 82/00445 | 2/1982 |
| WO | WO 84/04451 | 11/1984 |
| WO | WO 90/06097 | 6/1990 |
| WO | WO 92/09463 | 6/1992 |
| WO | WO 93/24342 | 12/1993 |
| WO | WO 96/15752 | 5/1996 |
| WO | WO 98/46184 | 10/1998 |
| WO | WO 00/08910 | 2/2000 |
| WO | WO 00/09356 | 2/2000 |
| WO | WO 00/12040 | 3/2000 |
| WO | WO 00/66060 | 11/2000 |
| WO | WO 02/34190 | 5/2002 |
| WO | WO 03/030800 | 4/2003 |
| WO | WO 03/034969 | 5/2003 |

OTHER PUBLICATIONS

"Bounder Plus Power Wheelchair: Convention "Tubular" Style Frame"; http://www.wheelchairs.com/plus.htm, Accessed on the World Wide Web on Dec. 17, 2003, p. 1-4.

"Frog Legs: Smoot Ride Ahead"; http://www.froglegsinc.com/index.php, Accessed on the World Wide Web on Dec. 17, 2003, p. 105.

"Frog Legs Tires", http://mdtap.org/tt/1999.09/prod.html, Accessed on the World Wide Web on Dec. 17, 2003, p. 1-3.

"Invacare pronto M7I jr. Power Wheelchair Manual"; Accessed on the World Wide Web on Dec. 17, 2003.

"Invacare Storm Series TDX Power Wheelchairs Manual"; Accessed on the World Wide Web on Dec. 17, 2003, p. 1-24.

"Invacare Xterra Series GT Power Wheelchair Manual", Accessed on the World Wide Web on Dec. 17, 2003, p. 1-4.

"Jazzy 1122", Pride Mobile Products Corp., Accessed on the World Wide Web on Dec. 17, 2003, p. 1-2.

"Jazzy 1133", Pride Mobile Products Corp., Accessed on the World Wide Web on Dec. 17, 2003, p. 1-2.

"Jazzy 1170XL", Pride Mobile Products Corp., Accessed on the World Wide Web on Dec. 17, 2003, p. 1-2.

"Bruno Independent Living Aids ISP 9001 Certified"; http://www.bruno.com/power_chairs.htm, Accessed on the World Wide Web on Dec. 17, 2003, p. 1-5 Top End Terminator SS Sp.

"Top End Terminator SS Sports Wheelchair", http://phc-online.com/terminator_ss.htm, Accessed on the World Wide Web on Dec. 17, 2003, p. 1-5.

"Transactions of the Institute of Measurement and Control", The British Library of Science Technology and Business, vol. 24, Nov. 5, 2002, p. 1-15.

M.J. Lawn, et al., "Modeling of a Stair-Climbing Wheelchair Mechanism with High Single-Step Capability", IEEE Transactions on Neutral Systems and Rehabilitation Engineering, V.

Quickie G-424 User Instruction Manual & Warranty, 930484 Rev. A (27 sheets) (alleged date not later than 2000).

10 photographs (8.5x11) of Quickie G-424 Wheelchair obtained Nov. 24, 2004.

Sunrise Medical, Inc., Power Products Parts Manual, 930307 Rev. K (531 Sheets), Jul. 2004. (Note: various dates are alleged therein based on wheelchair products listed includi.

International Search Report, Written Opinion and International Preliminary Examination Report from PCT/US02/02996, 16 pgs.

Office action from related U.S. Appl. No. 10/044,826 mailed Apr. 29, 2003.

"All-Terrain Wheelchair, Designer's Corner" Design News, Feb. 24, 1992, cover page and p. 54.

* cited by examiner

WHEELCHAIR SUSPENSION

RELATED APPLICATION

This application is a continuation application of U.S. patent application Ser. No. 10/044,826, filed Oct. 19, 2001 now U.S. Pat. No. 7,066,290 for WHEELCHAIR SUSPENSION HAVING PIVOTAL MOTOR MOUNT, the entire disclosure of which is fully incorporated herein by reference.

FIELD OF THE INVENTION

The invention relates generally to conveyances and, more particularly, to wheelchair suspensions capable of traversing an obstacle or rough terrain.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rear of the drive wheels. Though this configuration provided the wheelchair with greater stability, it made it difficult for such wheelchairs to climb over obstacles such as, for example, curbs or the like, because the front casters could not be driven over the obstacle due to their small size and constant contact with the ground.

U.S. Pat. No. 5,964,473 to Degonda et al. describes a wheelchair having front and rear casters similar to Garin and a pair of additional forward lift wheels. The lift wheels are positioned off the ground and slightly forward of the front caster. Configured as such, the lift wheels first engage a curb and cause the wheelchair to tip backwards. As the wheelchair tips backwards, the front caster raises off the ground to a height so that it either clears the curb or can be driven over the curb.

U.S. Pat. No. 6,196,343 to Strautnieks also describes a wheelchair having front and rear casters. The front casters are each connected to a pivot arm that is pivotally attached to the sides of the wheelchair frame. Springs bias each pivot arm to limit the vertical movement thereof. So constructed, each front caster can undergo vertical movement when driven over an obstacle.

While the above-mentioned art provides various wheelchair configurations for traversing obstacles, a need still exists for a more complete wheelchair suspension.

SUMMARY OF THE INVENTION

One embodiment of the present invention relates to a wheelchair suspension. The suspension includes a frame, a pivot arm, a front caster, a drive assembly and a rear caster. The pivot arm substantially remains in a first position when the drive assembly moves in a first direction. Movement of the drive assembly in a second direction urges the pivot arm away from the first position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The present invention provides a suspension system having a pivot arm and a pivoting drive assembly wherein pivotal movement of the drive assembly engages the pivot arm during pivotal motion in one direction and disengages from the pivot arm during pivotal motion in a second direction. When the drive assembly is engaged with the pivot arm, moment arms generated by the drive assembly facilitate upward pivotal movement of the pivot arm to traverse obstacles and rough terrain. In this scenario, the drive assembly and pivot arm pivot act together thereby raising the front castor attached to the pivot arm. Disengagement of the drive assembly from the pivot arm facilitates a smoother ride because the drive assembly can pivot independently of the pivot arm. In this scenario, the drive assembly and pivot arm have independent pivotal motion and function as two separate components.

Figure 1:
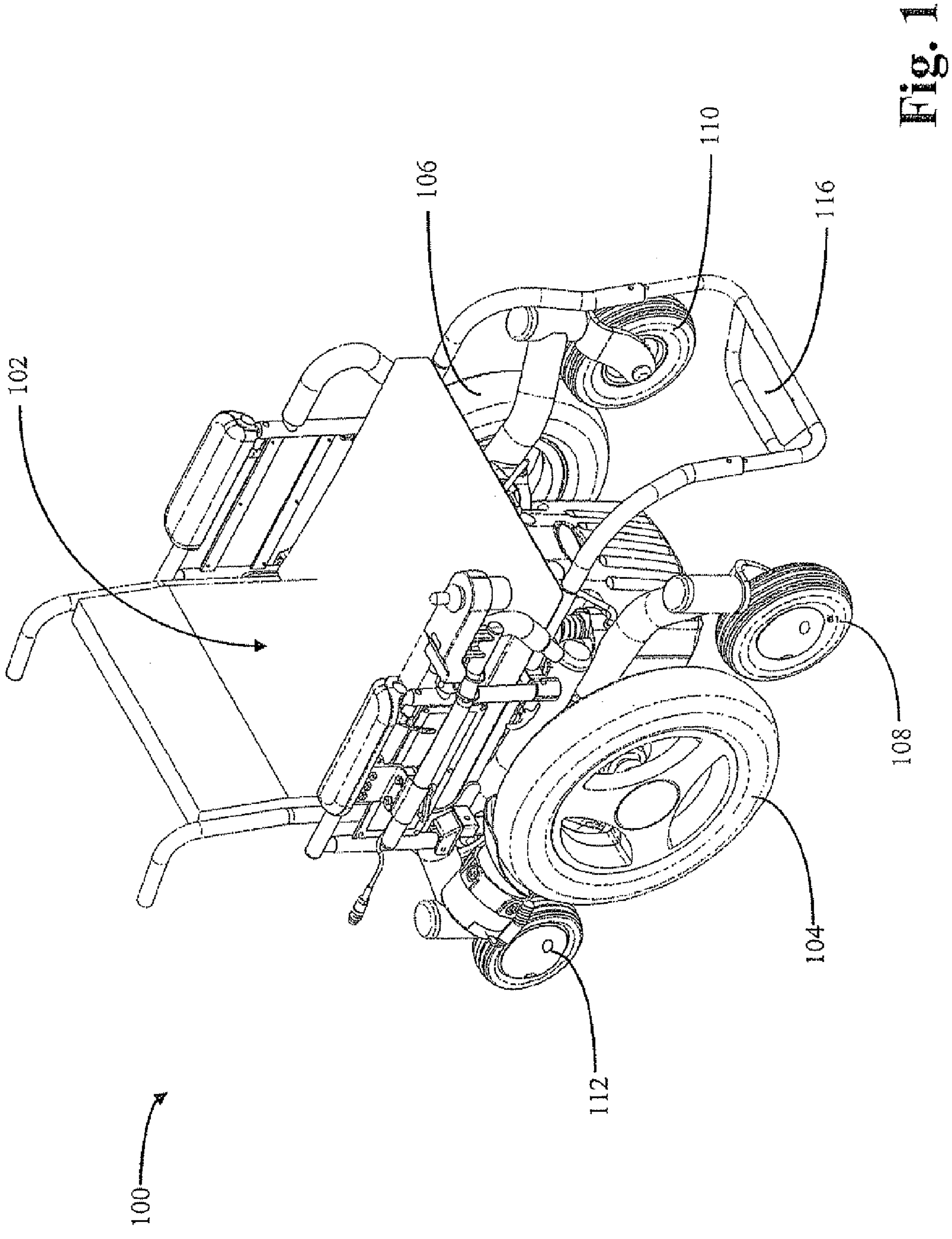
FIG. 1 is a perspective view of a wheelchair incorporating the suspension of the present invention.

Referring now to FIG. 1, a wheelchair 100 of the present invention is shown. Wheelchair 100 has a seat 102, drive wheels 104 and 106, front casters 108 and 110, and rear casters 112 and 114 (caster 114 shown in FIG. 2). Wheelchair 100 further has one or more footrests 116 and control circuitry for driving and steering the wheelchair. Wheelchair 100 is preferably configured as a mid-wheel drive wheelchair although other configurations are also possible.

Figure 2:
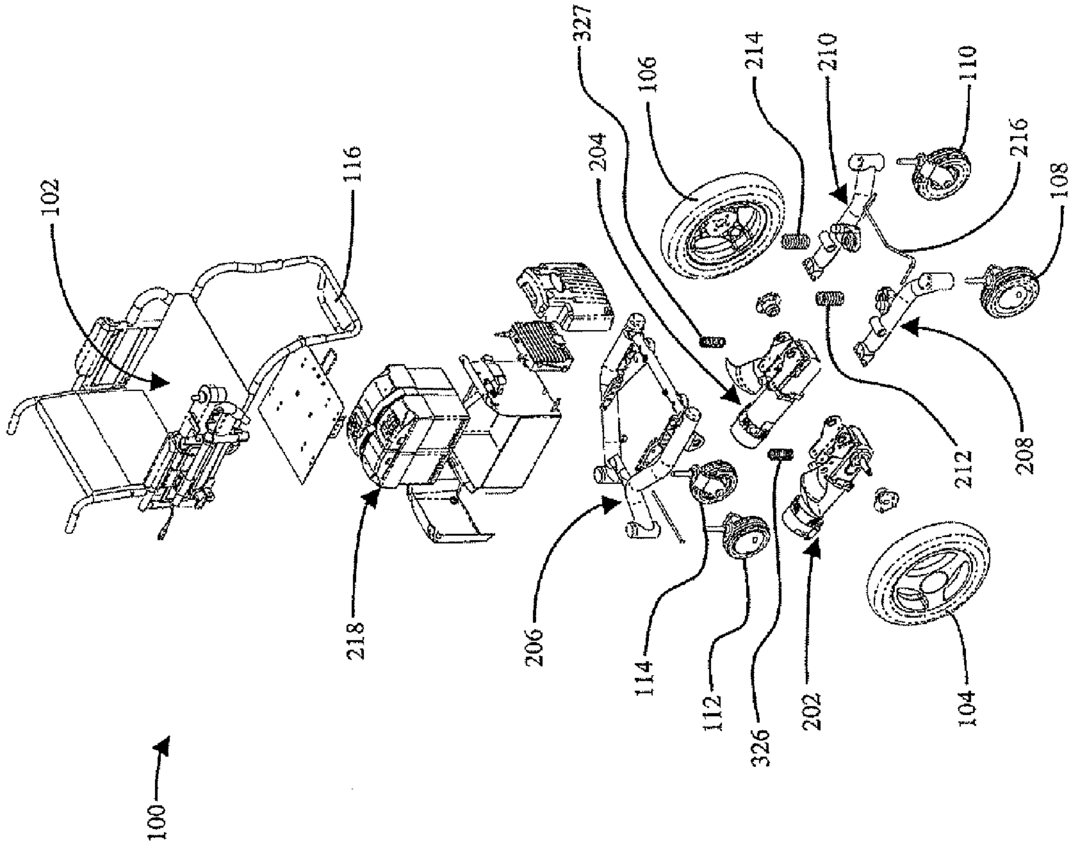
FIG. 2 is an exploded perspective view of certain components of the wheelchair of FIG. 1.

Illustrated in FIG. 2 is an exploded prospective view of wheelchair 100. In this regard, wheelchair 100 further has a frame 206 to which seat 102, front casters 108 and 110, and rear casters 112 and 114 are coupled. As will be described in more detail with reference to FIG. 3, wheelchair 100 has drive assemblies 202 and 204 and pivot arms 208 and 210 pivotally coupled to frame 206. Springs 212 and 214 are provided between pivot arms 208 and 210 and frame 206 to limit the amount of pivotal motion the arms can undergo. Additionally, a tension bar 216 is attached to and between pivot arms 208 and 210 to limit the amount of independent pivotal motion each arm can undergo before the other arm is influenced. The tension bar 216 is preferably made of a resilient spring-like metal that can undergo a limited amount of deformation or twisting and still return to its original shape or configuration. Batteries 218 are also provided and fit within frame 206 for providing power to drive assemblies 202 and 204.

Figure 3:
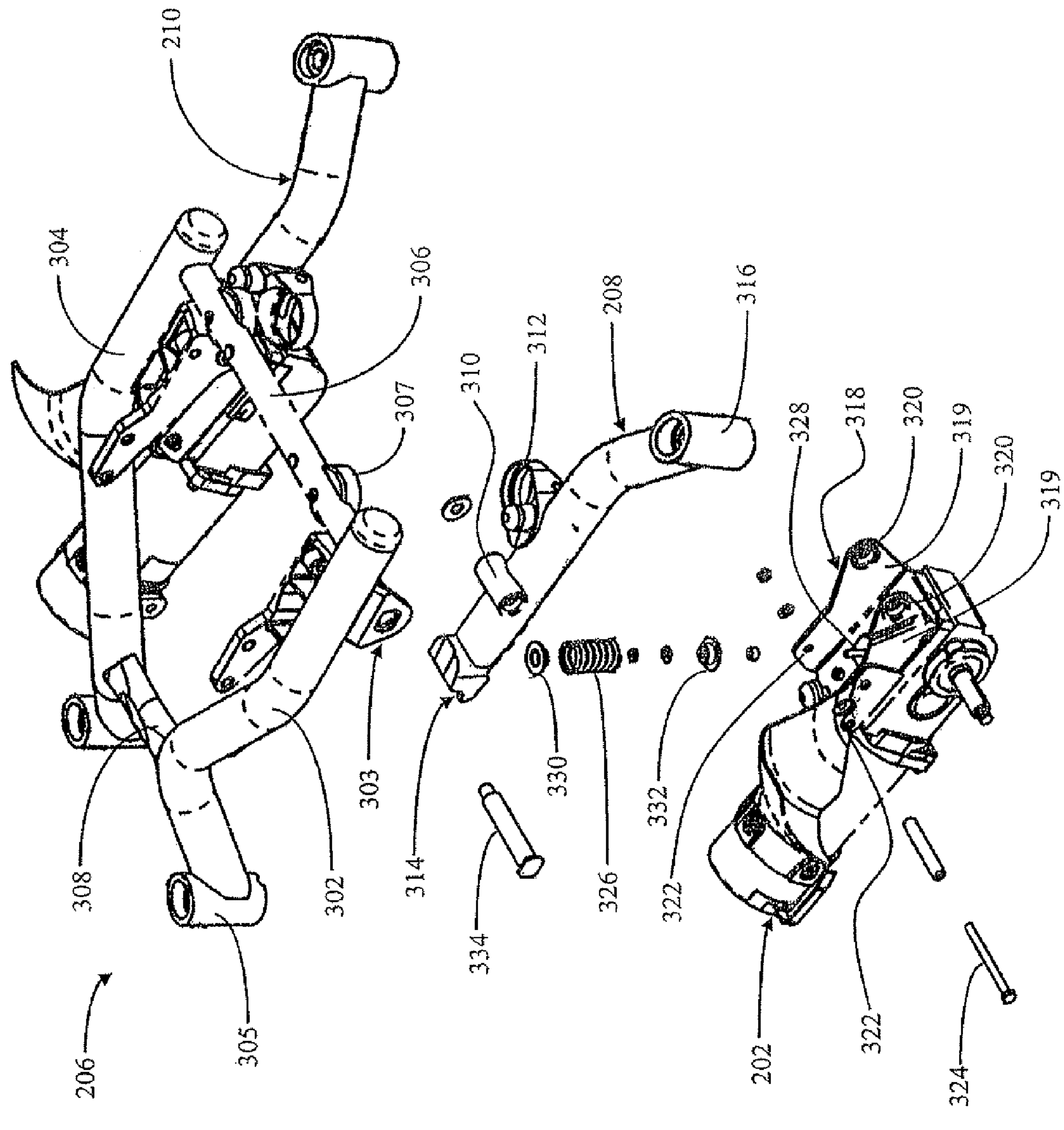
FIG. 3 is an exploded detail view of certain components of a frame and pivot assembly of the present invention.

Referring now to FIG. 3, an exploded prospective view of frame 206, pivot arm 208, and drive assembly 202 is provided. In this regard, frame 206 has a plurality of sub-members 302, 304, 306, and 308 coupled together as shown. In the preferred embodiment, frame sub-members 302, 304, 306, and 308 are preferably made of metal and welded together. Frame 206 further has a bracket 303 coupled to frame sub-member 302. Bracket 303 can be U-shaped having two spaced apart longitudinal extensions joined by a mid-section wherein the longitudinal extensions each have co-centered apertures therein for pivotally securing pivot arm 208 and drive assembly 202. Alternatively, bracket 303 can have two spaced apart longitudinal extensions that are welded or otherwise affixed to the bottom portion of frame sub-member 302 and include co-centered apertures for once again pivotally securing pivot arm 208 and drive assembly 202. Frame sub-member 304 has a similar bracket coupled thereto, but not shown.

Pivot arm 208 is preferably formed of tubular metal construction and has a head tube 316 for coupling a front caster thereto and a pivot arm engagement interface 314 for engaging drive assembly 202. As shown, head tube 316 is at the forward portion of pivot arm 208 and engagement interface 314 is to the rear portion thereof. Pivot arm 208 further has a pivotal mounting 310 that is between head tube 316 and engagement interface 314. Pivotal mounting 310 is preferably in the form of a cylindrical member that is either formed or attached to the body of pivot arm 208. Pivot arm 208 further has a spring seat 312 that aligns with a spring seat 307 for receiving and retaining compression spring 212 (compression spring 212 shown in FIG. 2). Pivot arm 210 is of similar construction.

Drive assembly 202 preferably has a motor/gearbox sub-assembly for driving one of the drive wheels and a pivotal mounting bracket 318. Alternately, the motor/gearbox assembly can be replaced with a brushless gearless motor drive. Pivotal mounting bracket 318 is in the form of a U-shaped bracket having spaced apart longitudinal members 319 joined by a mid-section at one of their ends. The mid-section is preferably used for mechanically attaching the motor/gearbox sub-assembly. The spaced apart longitudinal members 319 have projecting ear portions with co-centered apertures 320. Pivotal mounting bracket 318 further has a seat 328 for receiving a vertically-oriented compression spring 326 and its lower seat member 332. The upper portion of compression spring 326 along with upper seat member 330 are received within engagement interface 314 by a similar seat. In this regard, engagement interface 314 has a hollow space portion (not shown) for providing this configuration.

Drive assembly 202 further has a drive assembly engagement interface for engaging pivot arm 208. The drive assembly engagement interface has a pin or bolt 324 and co-centered apertures 322 in the longitudinal extensions 319 of pivotal mounting bracket 318. As will be presently described, the engagement interfaces of the drive assembly 202 and pivot arm 208 engage and disengage from each other under certain operating conditions.

Configured as such, pivot arm 208 and its pivotal mounting 310 are received within the longitudinal extensions 319 of pivotal mounting bracket 318 of drive assembly 202 with spring 326 seated in place. This sub-assembly is then received within the longitudinal extensions of mounting bracket 303 and the co-centered apertures therein. This entire assembly is then pivotally secured with a pin or bolt 334 that passes through the mounting bracket 303, drive assembly 202 bracket 318, and pivot arm 208 mounting tube 310. So formed, wheelchair 100 is provided with a suspension system wherein the drive assembly and pivot arm have a common pivotal coupling to the frame.

Figure 4A:
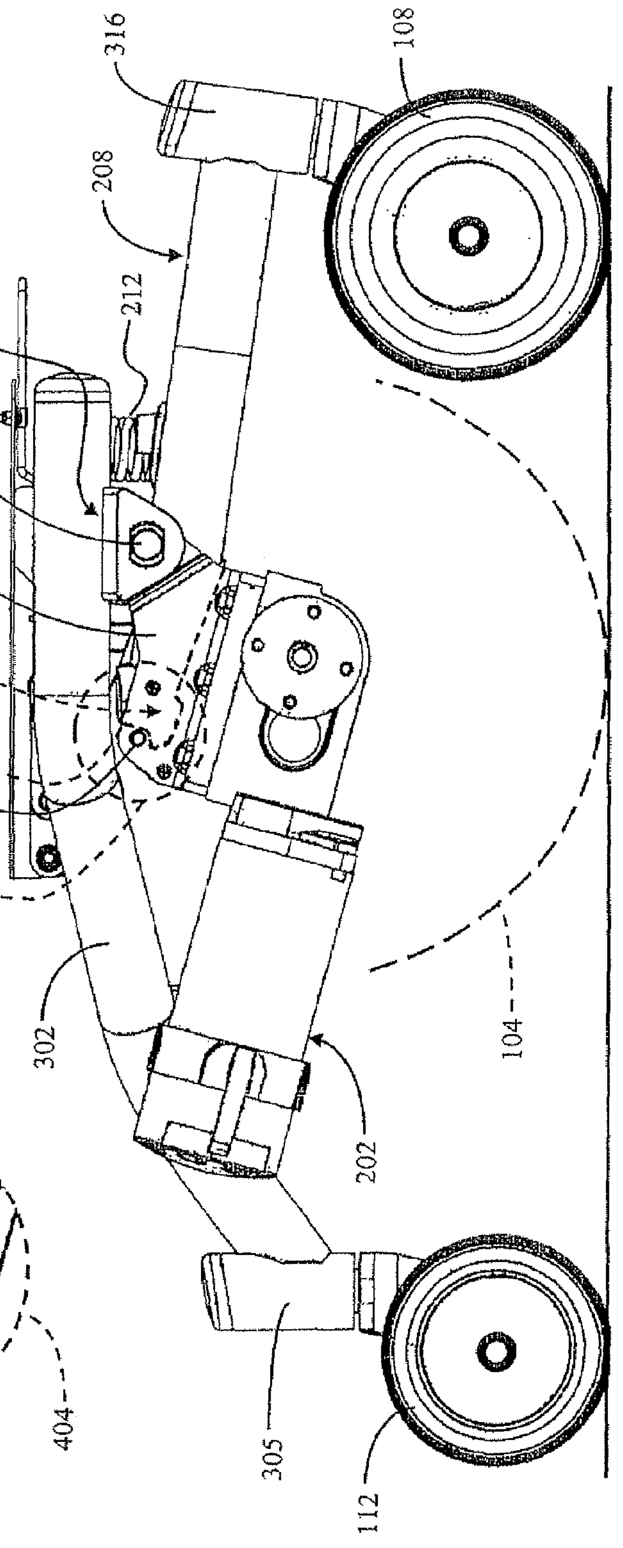
FIGS. 4A and 4B are side elevational views of the frame and pivot assembly under static conditions.
Figure 4B:
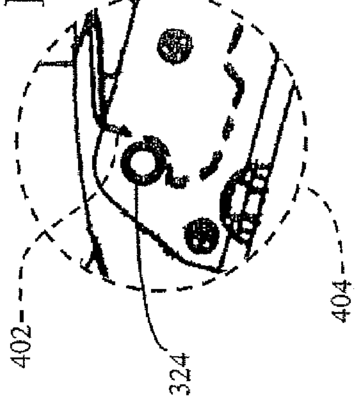

Referring now to FIGS. 4A and 4B, an elevational view of the suspension of wheelchair 100 under static conditions (i.e., no acceleration or deceleration) is shown. In this regard, all of the caster and drive wheels are in contact with the wheelchair supporting or driving surface. More specifically, the summation of the moment arms around pivot P is zero and, therefore, neither pivot arm 208 or drive assembly 202 undergo pivotal motion. Furthermore, spring 326 (shown in FIG. 3) urges the drive assembly engagement interface 324 into physical engagement with pivot arm engagement interface 314. More specifically, the force generated by spring 326 causes a surface of drive assembly engagement interface 324 to bear down upon engagement surface 402.

As shown more clearly in the enlarged detail 404 of FIG. 4B, pivot arm engagement interface 314 has an engagement surface 402 that is undulating in character and at least partially configured to receive drive assembly engagement interface 324. In this regard, engagement surface 402 is in the form a shoulder. However, any physical configuration that allows for the engagement and disengagement of drive assembly engagement surface 324 is contemplated.

Figure 5:
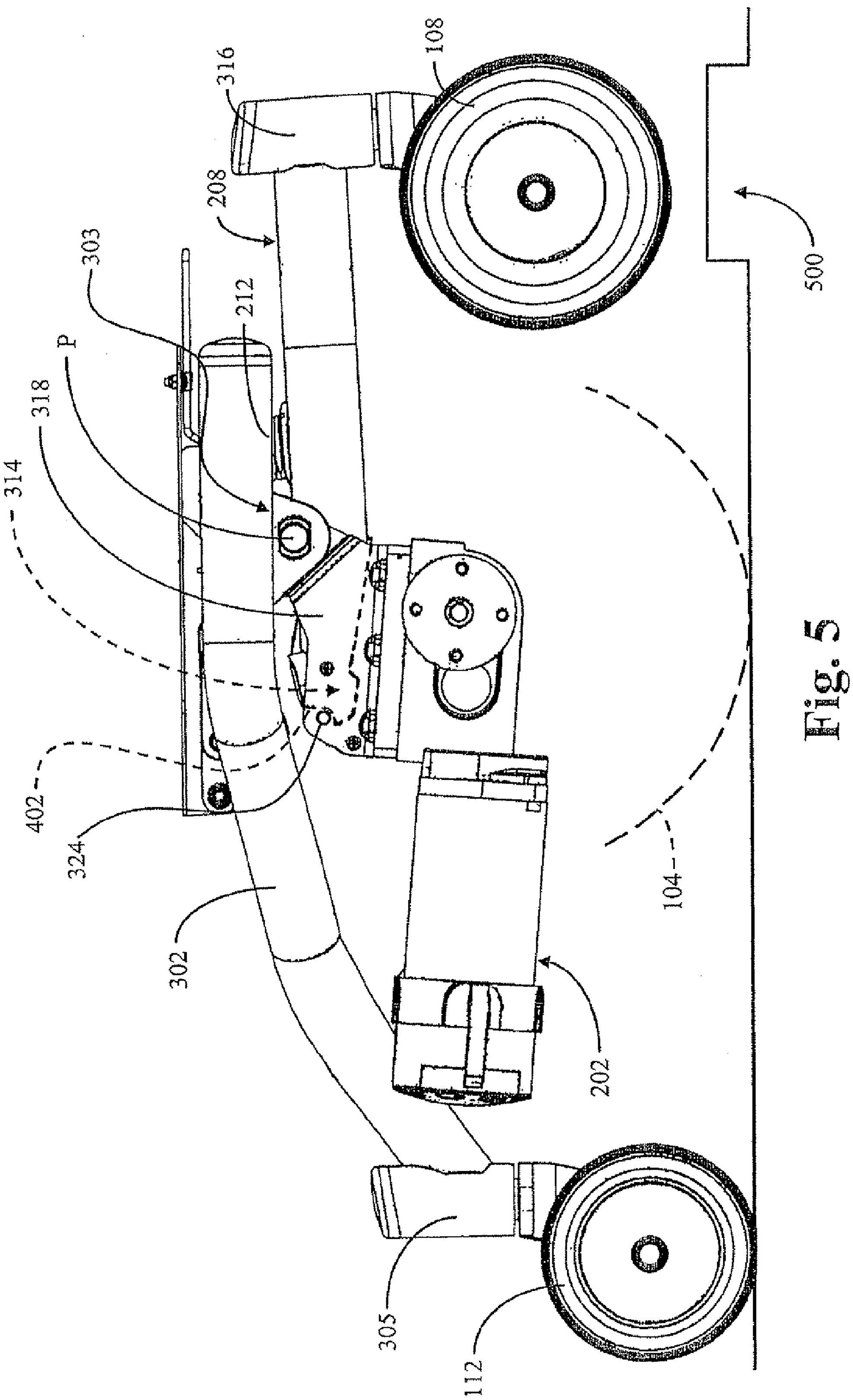
FIG. 5 is a side elevational view of the frame and pivot assembly traversing an obstacle by ascending an obstacle.

Illustrated in FIG. 5 is an elevational view of the suspension of wheelchair 100 traversing over an obstacle 500 by ascending the obstacle. This operating condition is accomplished by either rapidly accelerating wheelchair 100 in the forward direction or directly driving front caster 108 over obstacle 500. In this scenario, the moment arm generated by drive wheel 104 is greater then all other moment arms around pivot P. This causes drive assembly 202 to pivot counter-clockwise around pivot P. As such, drive assembly engagement interface 324 also pivots counter-clockwise around pivot P. In this scenario, drive assembly engagement interface 324 comes into engagement or already is in engagement with pivot arm engagement interface 314, thereby causing pivot arm 208 to also pivot counter-clockwise around pivot P. During this engagement, drive assembly engagement interface 324 is in physical contact with pivot arm engagement interface 314, as shown in FIG. 4B. This causes front caster 108 to rise above obstacle 500 or to be driven over obstacle 500. Hence, engagement interfaces 314 and 324 translate the pivotal motion of drive assembly 202 to pivot arm 208 to thereby raise front caster 108 to traverse obstacle 500.

Figure 6B:
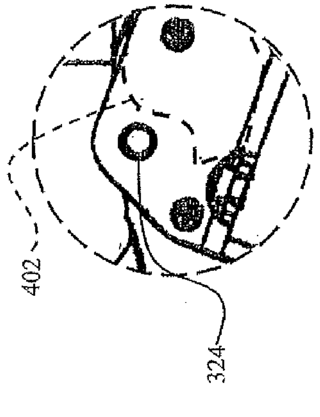
FIGS. 6A and 6B are further side elevational views of the frame and pivot assembly traversing an obstacle by ascending the obstacle.
Figure 6A:
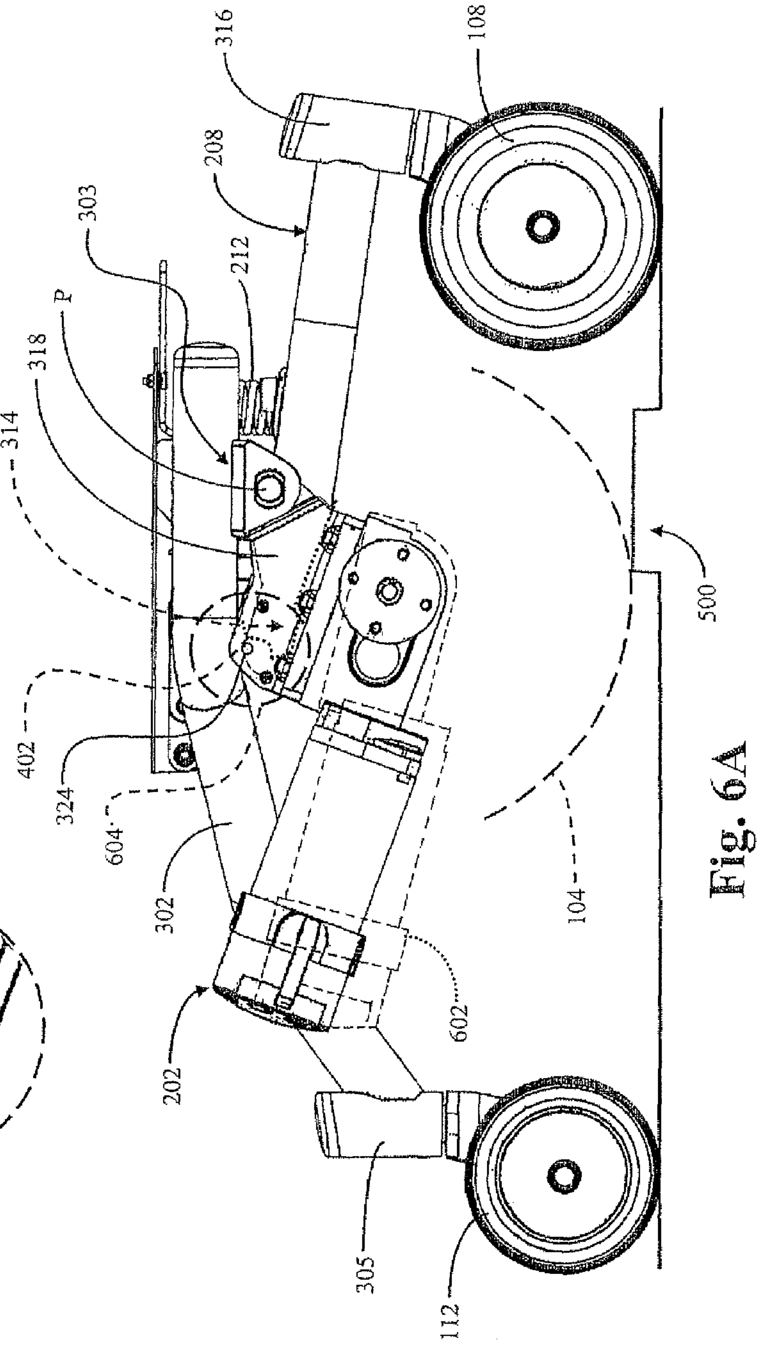

Referring now to FIGS. 6A and 6B, a side elevational view of the suspension of wheelchair 100 with drive wheel 104 traversing obstacle 500 is shown. In this regard, when drive wheel 104 comes into contact with obstacle 500, drive assembly 202 pivots in a clockwise direction around pivot P to soften the impact from obstacle 500. In FIG. 6A, the dashed outline 602 of drive assembly 202 represents the drive assembly's position prior to encountering obstacle 500 and the solid representation of drive assembly 202 represents its position after pivotal movement caused by encountering obstacle 500. During such pivotal movement, the drive assembly engagement interface 324 and the pivot arm engagement interface 314 physically disengage from each other. This state is more clearly shown in FIG. 6B wherein drive assembly engagement interface 324 is spaced apart from pivot arm engagement surface 402. The pivotal movement of drive assembly 202 is limited by spring 326 (shown in FIG. 3), which dampens the impact caused obstacle 500. After traversing obstacle 500, spring 326 causes drive assembly 202 to pivot counter-clockwise back to its position prior to encountering obstacle 500. This position includes the physical engagement between drive assembly engagement interface 324 and pivot arm engagement interface 314.

Figure 7:
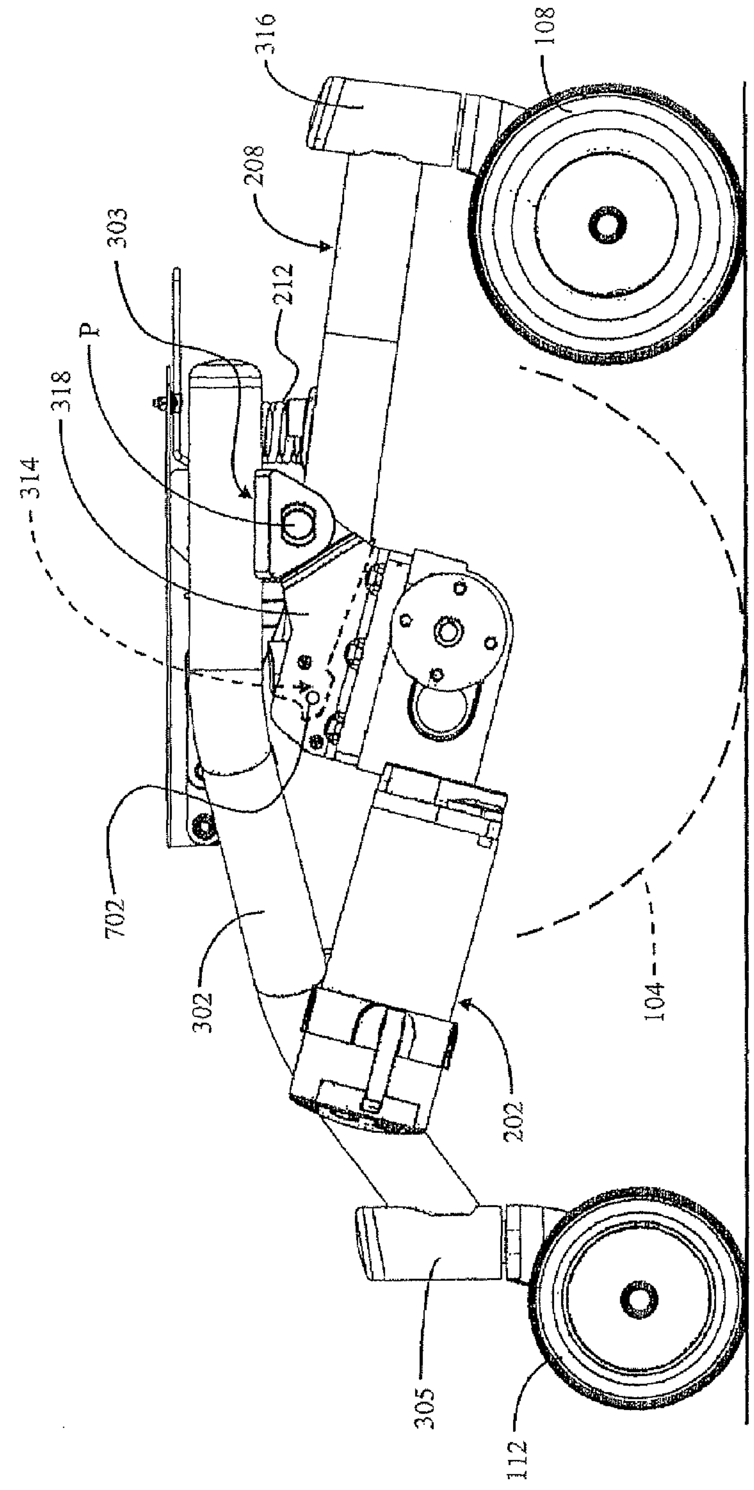
FIGS. 7, 8, and 9 are side elevational views of a second embodiment of the present invention.

Illustrated in FIG. 7 is a side elevational view of a second embodiment of the present invention. The second embodiment differs from the first in that the drive assembly 202 and the pivot arm 208 are rigidly coupled together. That is, the drive assembly 202 does not pivot independently of pivot arm 208. As a matter of design choice, springs 326 and 327 may or may not be used with this embodiment. This arrangement is facilitated by providing a latching mechanism between drive assembly 202 and pivot arm 208. In one embodiment, the latching assembly is in the form of a permanently welded or fastened pin 702. More specifically, pivotal mounting bracket 318 and pivot arm engagement interface 314 have co-centered apertures therein for receiving pin 702, which is then permanently affixed to either pivotal mounting bracket 318 and/or pivot arm engagement interface 314. In alternate embodiments, pin 702 can be a quick-release pin, threaded bolt, or screw allowing for a less permanent coupling. This would allow a user determine whether the drive motor assembly is pivotal or rigid with respect to the pivot arm 208 and frame 206.

Figure 8:
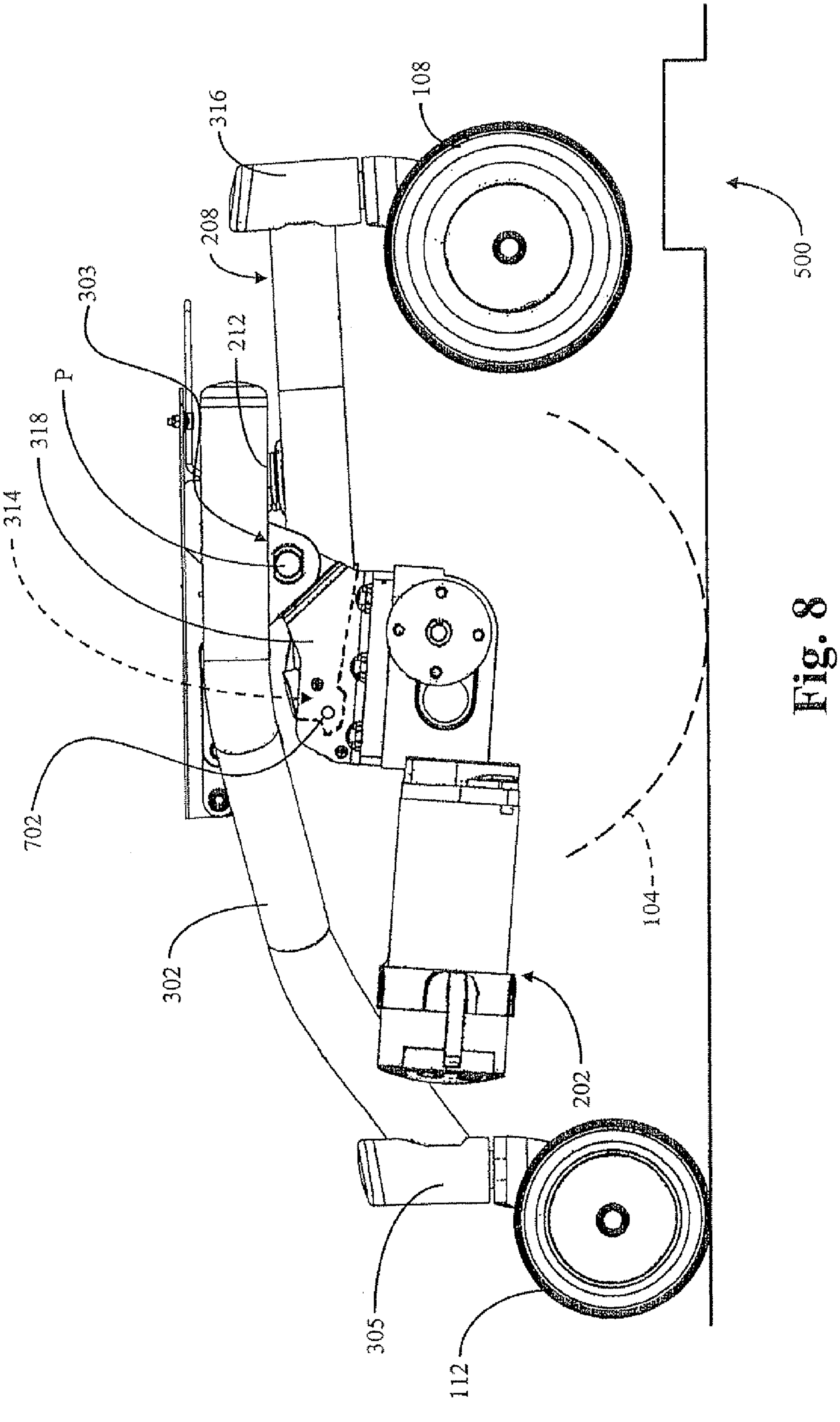

FIG. 8 illustrates the present embodiment when traversing obstacle 500 by ascending the obstacle. This operating condition is accomplished by either rapidly accelerating wheelchair 100 in the forward direction or directly driving front caster 108 over obstacle 500. In this scenario, the moment arm generated by drive wheel 104 is greater then all other moment arms around pivot P. This causes drive assembly 202 to pivot counter-clockwise around pivot P. Since drive assembly 202 is rigidly coupled to pivot arm 208 by pin 702, pivot arm 208 also pivots counter-clockwise around pivot P so as to lift front caster 108 to traverse obstacle 500.

Figure 9:
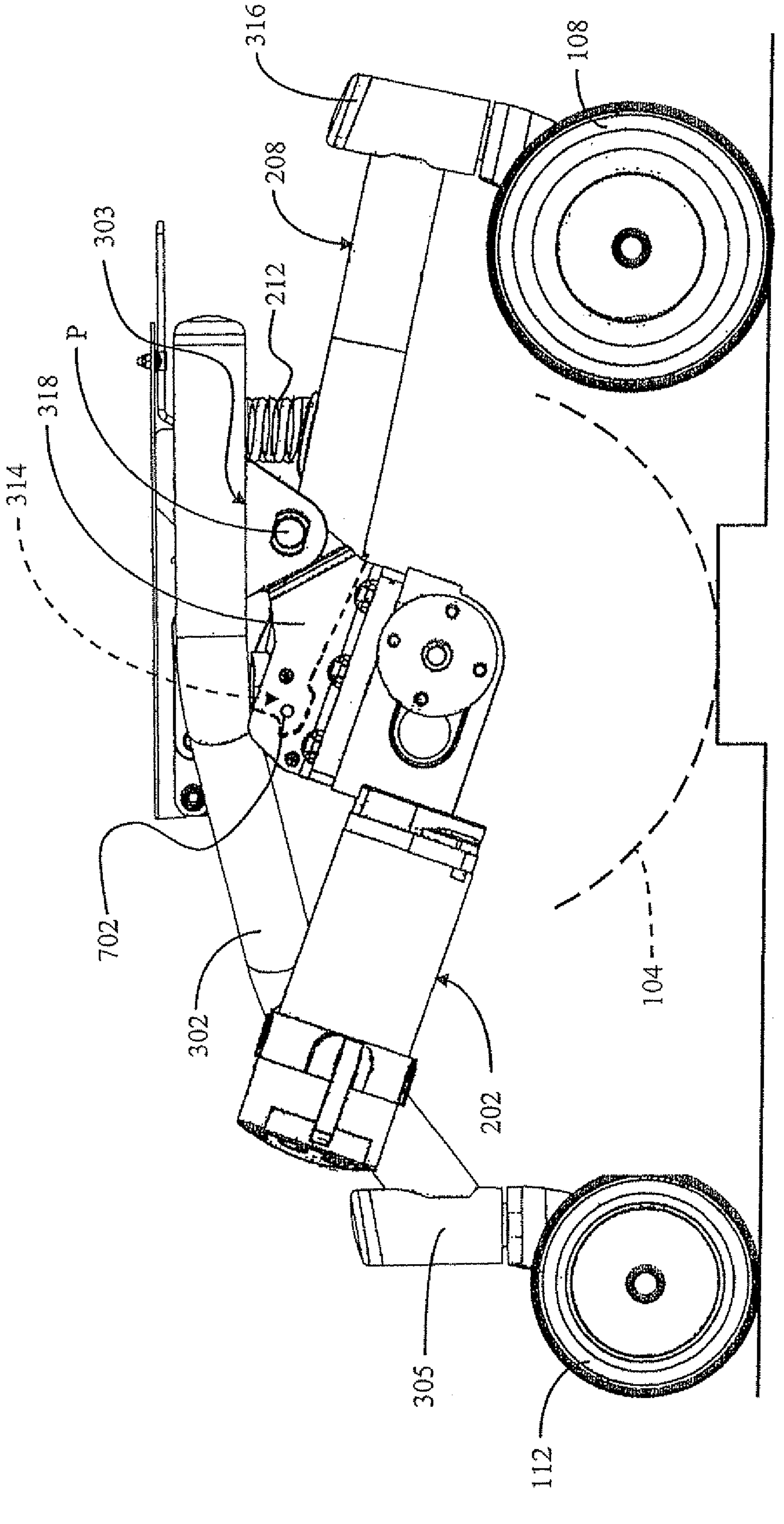

Illustrated in FIG. 9 is a side elevational view of the suspension of wheelchair 100 with drive wheel 104 traversing obstacle 500. In this regard, when drive wheel 104 comes into contact with obstacle 500, drive assembly 202 pivots in a clockwise direction around pivot P and causes pivot arm 208 and caster 208 to be brought down onto the lower driving surface elevation. Drive assembly 202 and pivot arm 208 act in unison due to their rigid coupling via pin 702, as described above. Springs 212 assist in this scenario by also urging pivot arm 208 to rotate about pivot P in clockwise direction. By causing pivot arm 208 and caster 108 to be brought down onto the lower driving surface elevation, the present invention provides the wheelchair with greater stability when traversing obstacle 500 and ensures that all of the wheelchair's wheel stay in constant contact with the wheelchair driving surface. Further embodiments of pivot arms, drive assemblies, and the dynamic analysis thereof are described in co-pending U.S. patent application Ser. No. 09/698,481, filed Oct. 27, 2000 and titled "Obstacle Traversing Wheelchair," which is hereby fully incorporated by reference.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, a plurality of casters can be used instead of one caster, one well-known latching means can be substituted for another, and the wheelchair component geometry can deviate from that shown without departing from the operative teaching herein. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A wheelchair suspension comprising:

a frame;

a pivot arm pivotally coupled to the frame;

a front caster coupled to the pivot arm;

a drive assembly pivotally coupled directly to the frame;

a rear caster coupled to the frame; and wherein the pivot arm substantially remains in a first position when the drive assembly moves in a first direction; and movement of the drive assembly in a second direction urges the pivot arm away from the first position.

2. The wheelchair suspension of claim 1 wherein pivotal movement of the drive assembly in the second direction pulls the pivot arm upward.

3. The wheelchair suspension of claim 1 wherein relative movement between the drive assembly and the pivot arm is dampened.

4. The wheelchair suspension of claim 3 wherein the relative movement between the drive assembly and the pivot arm is dampened by a spring.

5. The wheelchair suspension of claim 1 wherein the pivotal movement of the drive assembly in the second direction relative to the frame pulls the pivot arm upward to urge the front caster away from a support surface to traverse an obstacle.

6. The wheelchair suspension of claim 1 wherein the pivot arm and the drive assembly are coupled by a first engagement surface of the pivot arm and a second engagement surface of the drive assembly.

7. The wheelchair suspension of claim 6 wherein the first engagement surface comprises an undulating surface.

8. The wheelchair suspension of claim 6 wherein the first engagement surface is configured to engage the second engagement surface.

9. The wheelchair suspension of claim 8 wherein the second engagement surface is configured to disengage from the first engagement surface upon pivotal movement of the drive assembly in the first direction relative to the frame.

10. The wheelchair suspension for claim 1 wherein movement of the drive assembly in the first direction comprises upward movement of the drive assembly and movement of the drive assembly in the second direction comprises downward movement of the drive assembly.

11. The wheelchair suspension of claim 1 wherein movement of the drive assembly in the first direction is independent movement with respect to the pivot arm.

12. A wheelchair suspension comprising:

a frame;

a pivot arm pivotally coupled to the frame;

a front caster coupled to the pivot arm;

a drive assembly;

a rear caster coupled to the frame; and wherein the pivot arm and the drive assembly are coupled such that movement of the drive assembly in a first direction decouples at least a portion of the drive assembly from the pivot arm; and movement of the drive assembly in a second direction causes the pivot arm to move upward.

13. The wheelchair suspension of claim 12 wherein pivotal movement of the drive assembly in the second direction pulls the pivot arm upward.

14. The wheelchair suspension of claim 12 wherein relative movement between the drive assembly and the pivot arm is dampened.

15. The wheelchair suspension of claim 14 wherein the relative movement between the drive assembly and the pivot arm is dampened by a spring.

16. The wheelchair suspension of claim 12 wherein the pivot arm and the drive assembly are coupled by a first engagement surface of the pivot arm and a second engagement surface of the drive assembly.

17. The wheelchair suspension of claim 16 wherein the first engagement surface comprises an undulating surface.

18. The wheelchair suspension of claim 16 wherein the first engagement surface is configured to engage the second engagement surface.

19. The wheelchair suspension of claim 18 wherein the second engagement surface is configured to disengage from the first engagement surface upon pivotal movement of the drive assembly in the first direction relative to the frame.

20. The wheelchair suspension for claim 12 wherein movement of the drive assembly in the first direction comprises upward movement of the drive assembly and movement of the drive assembly in the second direction comprises downward movement of the drive assembly.

21. A wheelchair suspension comprising:

a frame;

a pivot arm pivotally coupled to the frame;

a front caster coupled to the pivot arm;

a drive assembly;

a rear caster coupled to the frame; and wherein the pivot arm and the drive assembly are coupled such that movement of the drive assembly in a first direction disengages the drive assembly from the pivot arm; and movement of the drive assembly in a second direction causes the pivot arm to move upward.

22. The wheelchair suspension of claim 21 wherein pivotal movement of the drive assembly in the second direction pulls the pivot arm upward.

23. The wheelchair suspension of claim 21 wherein the pivot arm and the drive assembly are coupled by a first engagement surface of the pivot arm and a second engagement surface of the drive assembly.

24. The wheelchair suspension of claim 23 wherein the first engagement surface comprises an undulating surface.

25. The wheelchair suspension for claim 21 wherein movement of the drive assembly in the first direction comprises upward movement of the drive assembly and movement of the drive assembly in the second direction comprises downward movement of the drive assembly.

26. A wheelchair suspension comprising:

a frame;

a pivot arm pivotally coupled to the frame;

a front caster coupled to the pivot arm;

a drive assembly;

a rear caster coupled to the frame; and wherein the pivot arm substantially remains in a first position when the drive assembly moves in a first direction; and movement of the drive assembly in a second direction pulls the pivot arm upward.

27. The wheelchair suspension of claim 26 wherein relative movement between the drive assembly and the pivot arm is dampened.

28. The wheelchair suspension of claim 27 wherein the relative movement between the drive assembly and the pivot arm is dampened by a spring.

29. The wheelchair suspension of claim 26 wherein the pivot arm and the drive assembly are coupled by a first engagement surface of the pivot arm and a second engagement surface of the drive assembly.

30. The wheelchair suspension of claim 29 wherein the first engagement surface comprises an undulating surface.

31. The wheelchair suspension of claim 29 wherein the first engagement surface is configured to engage the second engagement surface.

32. The wheelchair suspension of claim 29 wherein the second engagement surface is configured to disengage from the first engagement surface upon pivotal movement of the drive assembly in the first direction relative to the frame.

33. The wheelchair suspension for claim 26 wherein movement of the drive assembly in the first direction comprises upward movement of the drive assembly and movement of the drive assembly in the second direction comprises downward movement of the drive assembly.

34. The wheelchair suspension of claim 26 wherein movement of the drive assembly in the first direction causes independent movement of the drive assembly with respect to the pivot arm.

35. A wheelchair suspension comprising:

a frame;

a pivot arm having an engagement surface;

a pivot that couples the pivot arm to the frame;

a front caster coupled to the pivot arm;

a drive assembly;

a rear caster coupled to the frame; and wherein the pivot arm substantially remains in a first position when the drive assembly moves in a first direction; and movement of the drive assembly in a second direction transfers force from the drive assembly to the engagement surface of the pivot arm.

36. The wheelchair suspension of claim 35 wherein pivotal movement of the drive assembly in the second direction pulls the pivot arm upward.

37. The wheelchair suspension of claim 35 wherein relative movement between the drive assembly and the pivot arm is dampened.

38. The wheelchair suspension of claim 37 wherein the relative movement between the drive assembly and the pivot arm is dampened by a spring.

39. The wheelchair suspension of claim 35 wherein the pivotal movement of the drive assembly in the second direction relative to the frame pulls the pivot arm upward to urge the front caster away from a support surface to traverse an obstacle.

40. The wheelchair suspension of claim 35 wherein the pivot arm and the drive assembly are coupled by the engagement surface of the pivot arm and a second engagement surface of the drive assembly.

41. The wheelchair suspension of claim 40 wherein the first engagement surface comprises an undulating surface.

42. The wheelchair suspension of claim 40 wherein the first engagement surface is configured to engage the second engagement surface.

43. The wheelchair suspension of claim 42 wherein the second engagement surface is configured to disengage from the first engagement surface upon pivotal movement of the drive assembly in the first direction relative to the frame.

44. The wheelchair suspension for claim 35 wherein movement of the drive assembly in the first direction comprises upward movement of the drive assembly and movement of the drive assembly in the second direction comprises downward movement of the drive assembly.

45. The wheelchair suspension of claim 35 wherein movement of the drive assembly in the first direction causes independent movement of the drive assembly with respect to the pivot arm.

46. A method of traversing an obstacle with a wheelchair comprising:

energizing a drive assembly to cause pivotal movement of the drive assembly relative to a wheelchair frame such that the drive assembly urges a pivot arm upward over the obstacle;

engaging the obstacle with a drive wheel;

decoupling at least a portion of the drive assembly from the pivot arm;

pivoting the drive assembly with respect to the pivot arm upon engagement with the obstacle;

wherein the drive assembly transfers force to an engagement surface of the pivot arm that is located on the pivot arm such that a pivot of the pivot arm is disposed between the engagement surface and a front caster supported by the pivot arm.

47. A wheelchair suspension comprising:

a frame;

a pivot arm pivotally coupled to the frame;

a front caster coupled to the pivot arm;

a drive assembly pivotally coupled directly to the frame;

a rear caster coupled to the frame; and a means for coupling the pivot arm and the drive assembly such that pivotal movement of the drive assembly in a first direction results in independent movement of the drive assembly with respect to the pivot arm; and movement of the drive assembly in a second direction causes the pivot arm to move upward.

* * * * *